Nov. 21, 1950 — P. J. MARCHELEWICZ — 2,530,888
CAP FOR GREASE FITTINGS
Filed March 19, 1946
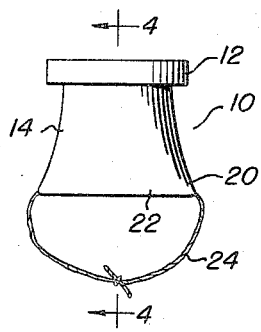
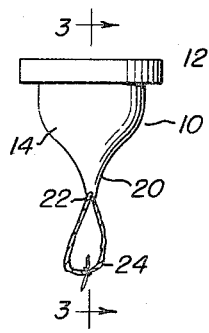
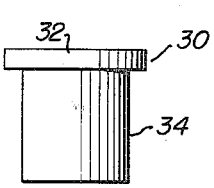
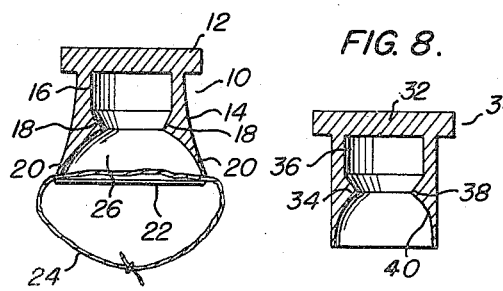
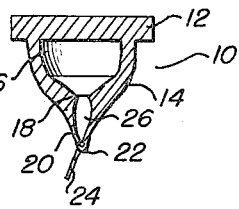
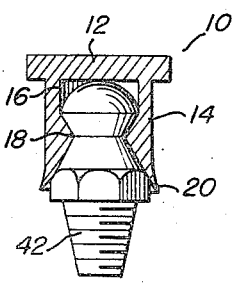
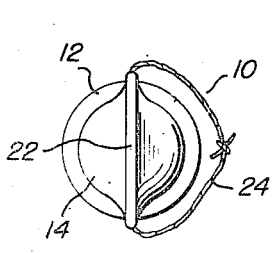
INVENTOR.
PETER J. MARCHELEWICZ
BY Victor J. Evans & Co.
ATTORNEYS Patented Nov. 21, 1950

2,530,888

UNITED STATES PATENT OFFICE 2,530,888

CAP FOR GREASE FITTINGS

Peter J. Marchelewicz, South Bend, Ind.

Application March 19, 1946, Serial No. 655,547

1 Claim. (Cl. 184—88)

This invention relates to a cap for grease fittings and is especially designed to prevent foreign matter such as water, scale and abrasives and particles of dust from entering the opening in the fittings and damaging or clogging the grease passage therein.

An object of the invention is to provide a device of this character that will keep the open end of the grease fitting clean, is simple in construction and application, and made of different colors, can indicate to the grease monkey whether or not that particular fitting has been greased.

With the above and other objects in view the invention consists of the novel details of construction, arrangement and combination of parts more fully hereinafter described, claimed and illustrated in the accompanying drawing in which:

Figure 1 is an elevational view of an embodiment of the invention;

Figure 2 is the same with Figure 1 turned in a 90° arc;

Figure 3 is a sectional view on the line 3—3 of Figure 2;

Figure 4 is a sectional view on the line 4—4 of Figure 1;

Figure 5 is a bottom plan view of the device;

Figure 6 is a sectional view of the invention applied to a grease fitting;

Figure 7 is an elevational view of a modified form and

Figure 8 is a sectional view thereof.

Referring more in detail to the drawing the reference numeral 10 designates the cap embodying the invention which is made of natural or synthetic rubber, plastic or any soft durable material that if dropped between gears or other parts of a motor will not cause damage thereto.

The cap is provided with a flat head 12 which is provided for easy handling and gripping thereof with the fingers in pulling the cap from the fitting to which it has been applied.

The body 14 of the cap is provided with a circular recess 16 in the center thereof adjacent the head 12 and the lower edges of the recess are tapered inwardly to form the shoulder 18 and the walls 20 below the shoulder 18 are tapered to a very thin edge 22 which is very flexible and will fit snugly over a grease fitting.

A cord 24 is inserted through the side walls 20 above the thin edge 22 either with the aid of a metal threader or the thread may be inserted over the side walls before the thin edge 22 is closed and sealed, thus all foreign matter is prevented from entering the recess 16 and recess 26 formed by the walls 20.

When it is desired to use the cap the edge 22 is ripped by the cord 24 and the cap is presented on the fitting after it has been cleaned by wiping or similar methods.

In Figures 7 and 8 the cap 30 is provided with the circular head 32 and cylindrical body 34 having the circular recess 36 therein provided with tapered lower edges to form the tapered shoulder 38 and the semi-spherical recess 40 which forms the lower edge of the shoulder 38. The cord is not used with this type of cap and the cap is merely slipped over the fitting 42 as shown in Figure 6. The bottom edge of the body 34 may be sealed and cut with a sharp instrument or it may be left open as desired.

A grease fitting cannot be properly cleaned by merely wiping off the foreign matter on the outside, since the opening can be clogged and when additional grease is applied the dirt clogging the opening will be forced into the parts being greased. By the use of a cap as described, the fitting can be kept clean and free from dirt and the passage can be kept clear of all foreign matter and each time a fitting is greased, a new cap can be applied of a different color. Thus it can be easily ascertained as to whether all fittings have been greased.

It is believed that the operation and construction of the invention will be apparent to those skilled in the art and it is to be understood that minor changes in the details of construction, arrangement and combination of parts may be resorted to provided they fall within the spirit of the invention and the scope of the appended claim.

Having thus described the invention what is claimed as new and desired to be obtained by Letters Patent is:

In a flexible cap for grease fittings having a head on one end thereof and a plurality of recesses therein to conform with said grease fittings, the improvement comprising a thin wall on said cap opposite to the head thereon for the sealing of said cap and a cord in said cap inwardly of the thin wall thereof for severing said thin wall before application of the cap to the grease fitting.

PETER J. MARCHELEWICZ.

REFERENCES CITED

The following references are of record in the file of this patent:

UNITED STATES PATENTS

| Number | Name | Date |
|---|---|---|
| 1,379,609 | Barry | May 31, 1921 |
| 1,581,412 | Wishart | Apr. 20, 1926 |
| 1,644,220 | Anderson | Oct. 4, 1927 |
| 2,093,130 | Kurkjian | Sept. 14, 1937 |